United States Patent
Henson et al.

(10) Patent No.: US 10,300,901 B2
(45) Date of Patent: May 28, 2019

(54) VALIDATION OF BRAKE TORQUE SIGNAL FOR USE AS A BRAKE EVENT

(71) Applicants: Scott E Henson, Chelsea, MI (US); Carl J Missbach, Ann Arbor, MI (US); Thomas E Bloomfield, Livonia, MI (US); Dhaval Shah, Rochester Hills, MI (US)

(72) Inventors: Scott E Henson, Chelsea, MI (US); Carl J Missbach, Ann Arbor, MI (US); Thomas E Bloomfield, Livonia, MI (US); Dhaval Shah, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 44 days.

(21) Appl. No.: 15/165,315

(22) Filed: May 26, 2016

(65) Prior Publication Data
US 2017/0341636 A1 Nov. 30, 2017

(51) Int. Cl.
*B60T 17/22* (2006.01)
*B60T 7/04* (2006.01)

(52) U.S. Cl.
CPC ............ *B60T 17/221* (2013.01); *B60T 7/042* (2013.01); *B60T 2270/10* (2013.01)

(58) Field of Classification Search
None
See application file for complete search history.

(56) References Cited

U.S. PATENT DOCUMENTS

| 5,722,744 A * | 3/1998 | Kupfer | B60T 7/042 303/10 |
| 9,108,604 B2 * | 8/2015 | Bohm | B60T 8/4081 |
| 2008/0306667 A1 * | 12/2008 | Karnjate | B60T 7/042 701/70 |
| 2016/0053839 A1 * | 2/2016 | Putz | B60T 13/065 701/74 |
| 2017/0008503 A1 * | 1/2017 | Romana | B60T 8/885 |

* cited by examiner

*Primary Examiner* — Abby Y Lin
*Assistant Examiner* — Kyung J Kim
(74) *Attorney, Agent, or Firm* — Ralph E. Smith (57) ABSTRACT

In a method, a brake torque signal provided by an electronic control unit of an anti-lock braking system is validated. The brake torque signal is enabled for use as a brake event input signal upon being successfully validated for diagnostic and control routines of the vehicle that use the brake torque signal as a brake event input signal. If the brake torque signal fails validation, it is disabled for such use. The brake torque signal is validated by first rationalizing a brake pedal position signal and a master cylinder pressure signal. Once the brake pedal position signal is successfully rationalized with the master cylinder pressure signal, the brake pedal position signal is rationalized with the brake torque signal. The brake torque signal is successfully validated when both rationalizations are successful. The validation fails if either rationalization fails.

6 Claims, 7 Drawing Sheets

VALIDATION OF BRAKE TORQUE SIGNAL FOR USE AS A BRAKE EVENT

FIELD

The present invention relates to a method of validating a brake torque signal by rationalizing a brake pedal position signal and a master cylinder pressure signal and also rationalizing the brake pedal position signal and the brake torque signal and enabling or disabling use of the brake torque signal as a brake event input signal depending on the results of the validation.

BACKGROUND

In automotive vehicles, a brake event signal is used as an input for various diagnostic routines included in on-board diagnostics ("OBD") of the vehicle and also as an input for various control routines. A brake event signal as used herein means a signal that indicates that the brakes of the vehicle are being applied or are being released. The vehicle's OBD is implemented in one or more electronic control units in the vehicle, such as in an electronic control unit of the vehicle's engine management system. Control routines that control various aspects of the vehicle are also implemented in one or more electronic control units of the vehicle. By way of example and not of limitation, control and diagnostic routines that use the brake event signal as an input include misfire target learning, air conditioner control, diagnostics management, diagnostics management (freeze frame reporting), electric vacuum pump diagnostics, steering angle diagnostics.

Heretofore, a brake pedal position signal or a master cylinder pressure signal has often been used as the brake event signal. The brake pedal position signal is a signal that indicates the position of the brake pedal, such as along a travel range from fully depressed to fully released. The master cylinder pressure signal is a signal that indicates a pressure of brake fluid in the master cylinder. It should be understood that this pressure can be indicative of the pressure in any chamber of the master cylinder that is pressurized when a driver applies the brakes of the vehicle by pushing the brake pedal.

Modern vehicles are typically equipped with anti-lock braking systems that include an electronic control unit and hydraulics for preventing the brakes from locking when they are being applied. In some cases, the hydraulics are operable independently of the master cylinder to apply the vehicle's brakes. The control of the anti-lock braking system is often included in an electronic stability control system of the vehicle either as a separate anti-lock braking electronic control unit or as part of an electronic control unit of the electronic stability control system.

In vehicles having certain types of autonomous driver assistance systems, the autonomous driver assistance system has autonomous braking events in which the autonomous driver assistance system automatically causes the vehicle's brakes to be applied without the driver having pressed the brake pedal. It does so by causing the vehicle's brakes to be applied by the anti-lock braking system in which the hydraulics are operable independently of the master cylinder to apply the brakes. An autonomous braking event is a braking event that occurs when the autonomous driver assistance system determines that the vehicle should be braked and causes the vehicle's brakes to be applied without a driver pressing the brake pedal. One example of an autonomous driver assistance system having an autonomous braking event is adaptive cruise control where a vehicle having its cruise control active is automatically slowed as it approaches a vehicle in front of it, in some cases by the automatic application of the vehicle's brakes by the autonomous driver assistance system.

The electronic control unit of the anti-lock braking system provides a brake torque signal indicative of the amount of brake torque being applied during braking of the vehicle. It should be understood that brake torque signal in this context can be an analog signal having a level indicative of the brake torque or a digital value indicative of the brake torque being applied. In normal braking when the driver has depressed the brake pedal, the master cylinder provides pressurized brake fluid to the brakes to apply them. The master cylinder pressure signal is provided to the electronic control unit of the anti-lock braking system which uses it to determine the brake torque and generate the brake torque signal. In cases where the brakes are being operated by the anti-lock braking system either in an anti-lock braking action or in an autonomous braking event, the electronic control unit of the anti-locking braking systems determines the brake torque to be applied and generates the brake torque signal accordingly.

In autonomous driver assistance systems having autonomous braking events, the brake pedal position signal and the master cylinder pressure signal do not indicate all braking events as the autonomous braking events occurs independently of a driver pressing the brake pedal. When this occurs, the hydraulics of the anti-lock braking system operate independently of the master cylinder to apply the brake and in these situations. Thus, there is not a brake pedal position signal indicating that the brake pedal has been depressed or a master cylinder pressure signal indicative of pressurized brake fluid in the master cylinder.

In OBD diagnostics, a component must typically fail the diagnostic multiple times for the OBD diagnostic to set a fault code for that component, and typically set an alert such as illuminating the "check engine" light in the vehicle. To prevent false failures, the inputs to the diagnostic routines of the OBD are required to be rationalized before they can be used by the applicable diagnostic routines. That is, each input of a sensed a condition must be compared against another input of a sensed similar condition at essentially the same time and the two inputs must correlate with each other for the rationalization of the input to be determined to be successful.

Figure 1:
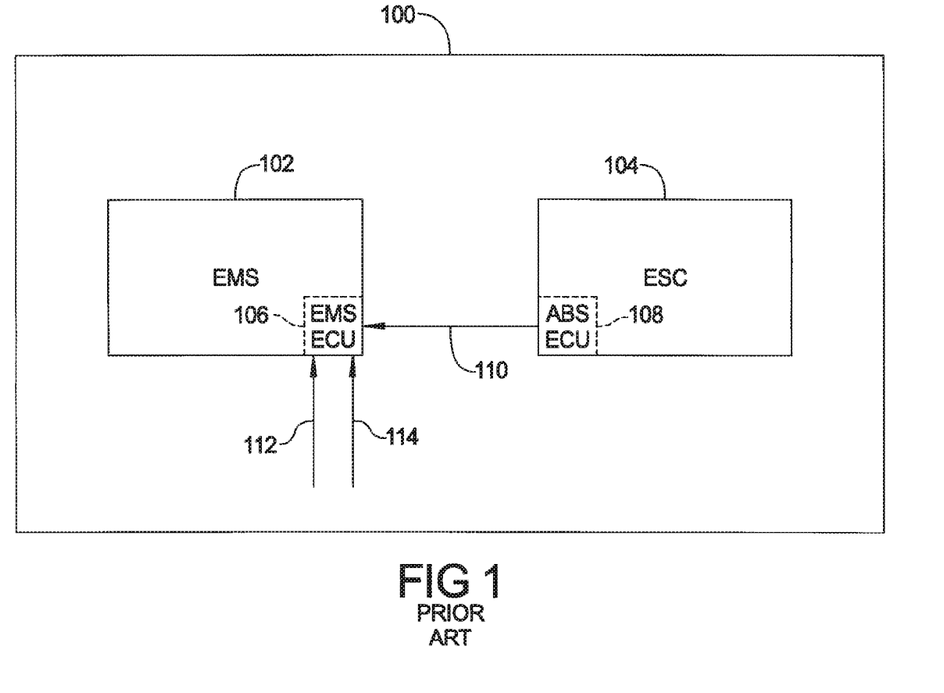
FIG. 1 is simplified block diagram of a prior art vehicle showing an engine management system of the vehicle and an anti-lock brake electronic control unit of an electronic stability control system of the vehicle.

FIG. 1 is a simplified block diagram of a prior art vehicle 100 having an engine management system referred to herein as EMS 102 and an electronic stability control system referred to herein as ESC 104. EMS 102 includes an EMS electronic control unit referred to herein as EMS ECU 106. ESC 104 includes an anti-lock braking system electronic control unit referred to herein as ABS ECU 108. It should be understood that ABS ECU 108 could be part of an electronic control unit (not shown) for ESC 104. ABS ECU 108 provides brake torque signal 110 as an input to EMS ECU 106. EMS ECU 106 also has an inputs a brake pedal position signal 112 and a master cylinder pressure signal 114.

SUMMARY

In accordance with an aspect of the present disclosure, a brake torque signal provided by an electronic control unit of an anti-lock braking system is validated and after being successfully validated, diagnostic routines of the vehicles OBD that use the brake torque signal as a brake event input signal are enabled. The brake torque signal is validated by first rationalizing a brake pedal position signal and a master cylinder pressure signal. Once the brake pedal position signal is successfully rationalized with the master cylinder pressure signal, the brake pedal position signal is rationalized with the brake torque signal and the brake torque is successfully validated when the brake pedal position signal is successfully rationalized with the brake toque signal after the brake torque signal has first been successfully rationalized with the master cylinder pressure cylinder. Upon the brake torque signal being successfully validated, the use of the brake torque signal as a brake event input signal is enabled. When the brake torque signal fails the rationalization, the use of the brake torque signal as a brake event input signal is disabled. In aspect, the validation of the brake torque signal is carried out by an electronic control unit of the vehicle which in an aspect is an electronic control unit of an engine management system of the vehicle such as EMS ECU 106.

In an aspect, the brake pedal position signal is rationalized with the master cylinder pressure signal by comparing transitions of the brake pedal position signal with transitions of the master cylinder pressure signal and determining whether the brake pedal position signal is successfully rationalized with the master cylinder pressure signal based on whether the transitions of the brake pedal position signal and transitions of the master cylinder pressure signal track each other. In an aspect, the brake pedal position signal is rationalized with the brake torque signal by comparing transitions of the brake pedal position signal with transitions of the brake torque signal and determining whether the brake pedal position signal is successfully rationalized with the brake torque signal on whether the transitions of the brake pedal position signal and transitions of the master cylinder pressure signal track each other.

In an aspect, rationalizing the brake pedal position signal with the master cylinder pressure signal further includes determining with the electronic control unit that the brake pedal position signal and the master cylinder pressure signal were successfully rationalized upon a predetermined number of first test events having occurred without a predetermined number of fail transitions of the brake pedal position signal and the master cylinder pressure signal not tracking each other having occurred wherein the first test event is each first to occur transition of the brake pedal position signal or the master cylinder pressure signal. In an aspect, rationalizing the brake pedal position signal and the brake torque signal further includes determining with the electronic control unit that the brake pedal position signal and the brake torque signal were successfully rationalized upon a predetermined number second test events having occurred without a predetermined number of fail transitions of the brake torque signal not tracking the transitions of the brake pedal position signal each other having occurred wherein the second test event is each transition of the brake pedal position signal.

In an aspect, determining whether the brake pedal position signal is successfully rationalized with the master cylinder pressure signal based on whether the transitions of the brake pedal position signal and transitions of the master cylinder pressure signal track each other includes making the determination based on whether the a predetermined number of successive transitions of the brake pedal position signal and master cylinder pressure signal track each other. In an aspect, determining whether the brake pedal position signal is successfully rationalized with the brake torque signal based on whether the transitions of the brake pedal position signal and transitions of the brake torque signal each other includes making the determination based on whether a predetermined number of successive transitions of the brake pedal position signal and brake torque signal track each other. In aspect, each of the predetermined numbers is a calibratable number which can be set during calibration. The predetermined numbers can be the same as each other or different from each other.

In an aspect, determining that the transitions of the brake pedal position signal and the master cylinder pressure signal are tracking each other includes determining that they track each other when after each first to occur transition of the brake pedal position signal about a brake pedal position threshold or the master cylinder pressure signal about a master cylinder pressure threshold, the other of the brake pedal position signal has with a comparable transition about the brake pedal position threshold within a first predetermined time or the master cylinder pressure signal has a comparable transition about the master cylinder pressure threshold within the first predetermined time. In an aspect, determining that the transitions of the brake pedal position signal and the brake torque signal are tracking each other includes determining that they track each other when after each transition of the brake pedal position signal about the brake pedal position threshold the brake torque signal has a comparable transition about a brake torque threshold within a second predetermined time. In an aspect, each of the first and second predetermined times is a calibratable number. The first and second predetermined times can be the same as each other or different from each other.

BRIEF DESCRIPTION OF THE DRAWINGS

The present invention will become more fully understood from the detailed description and the accompanying drawings, wherein.

DETAILED DESCRIPTION

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

In the flow charts that follow as FIGS. 2-8, the following abbreviations are used that have the following meanings: MCP—master cylinder pressure; MCPS—master cylinder pressure signal; BPP—brake pedal position; BPPS—brake pedal position signal; BT—brake torque; BTS—brake torque signal.

Figure 2:
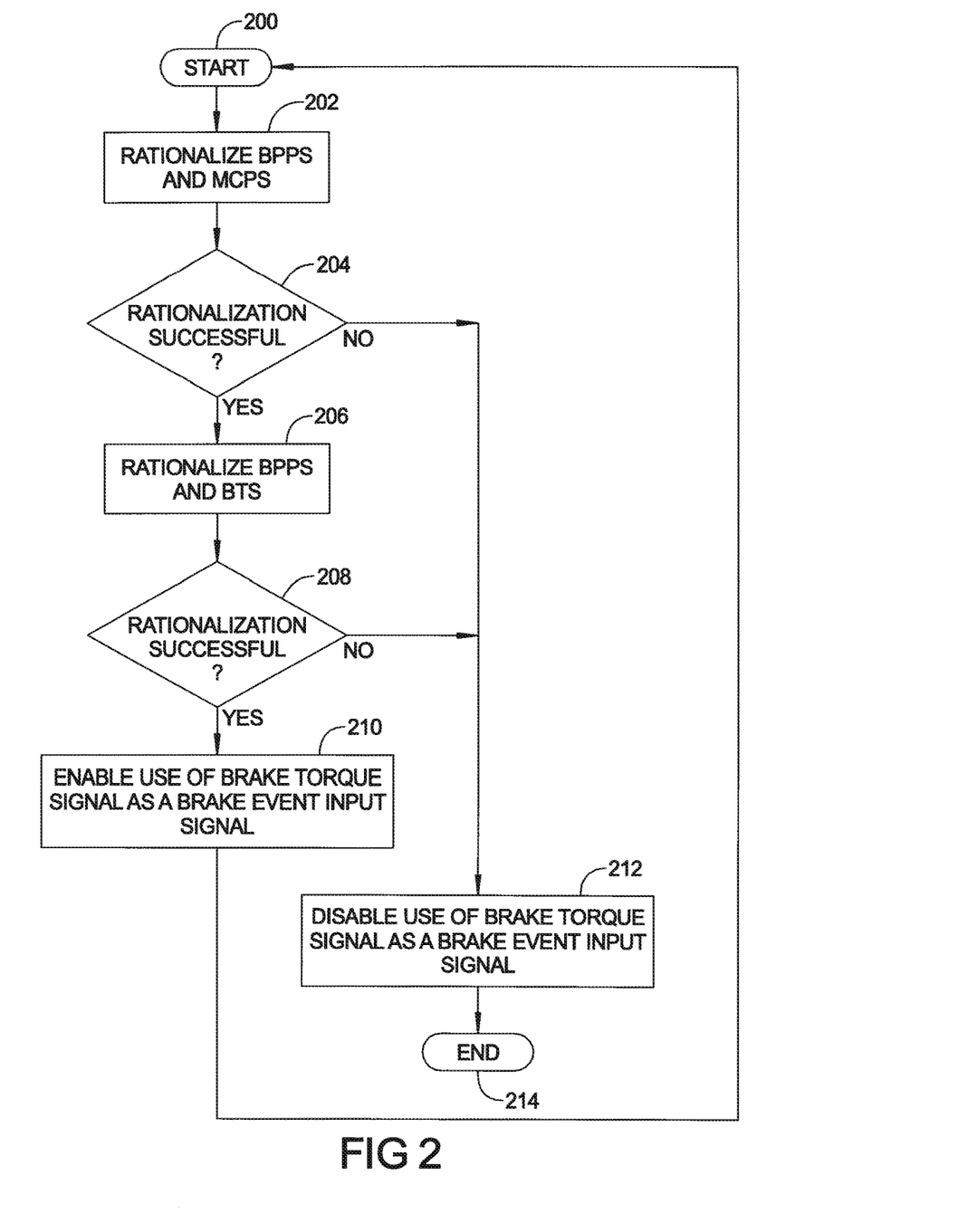
FIG. 2 is a flow chart of logic for a routine in accordance with an aspect of the present disclosure to validate the use of the brake torque signal as a brake event input signal for diagnostic and control routines of the vehicle's OBD that use as an input a brake event input signal and enabling or disabling the use of the brake torque signal as a brake event input signal for such routines depending on whether the validation of the brake torque signal was successful.

FIG. 2 is a flow chart of logic for a routine in accordance with an aspect of the present disclosure to validate the use of the brake torque signal as a brake event input signal for diagnostic routines of the vehicle's OBD that use as an input a brake event signal and for control routines that do the same and enabling or disabling the use of the brake torque signal as a brake event input signal for such routines depending on whether the validation of the brake torque signal was successful. The routine starts at 200. At 202, the routine rationalizes the brake pedal position signal with the master cylinder pressure signal. If at 204 this rationalization failed, the validation of the brake torque signal for use as a brake event input signal has also failed and the routine branches to 212 where it disables the use of the brake torque signal as a brake event input signal for the remainder of the current drive cycle. The routine then proceeds to 214 where it ends.

If at 204 the rationalization of the brake pedal position signal with the master cylinder pressure signal was successful, the routine proceeds to 208 where it rationalizes the master cylinder pressure signal with the brake toque signal. If at 208 this rationalization failed, the validation of the brake torque signal for use as a brake event input signal has also failed and the routine branches to 212.

If at 208 the rationalization of the master cylinder pressure signal with the brake torque signal was successful, the validation of the brake torque signal for use as a brake event input signal was successful and the routine proceeds to 210 where it enables the use of the brake torque signal as a brake event input signal. The routine then branches back to 202 where it repeats the foregoing. It should be understood, that this routine is continuously repeated during the current drive cycle unless the validation fails as there can be conditions that occur as a vehicle is being driven, a sensor failure for example, that would make it inappropriate to continue to use the brake torque signal as a brake event input signal as the sensor failure might then result in a false determination that such a diagnostic or control routine (or routines) failed. In an aspect, the electronic control unit of the engine management system sets a validation pass flag, such as in memory of the electronic management, when the validation passes and clears the validation pass flag when the validation fails. The diagnostic and control routines that use the brake torque signal as a brake event input signal then check the status of this flag to determine whether they can use the brake torque signal as a brake event input signal and act accordingly. For example, depending on the routine, the routine is disabled or the routine compensates for not being able to use the bake torque signal as a brake event input signal.

Figure 3:
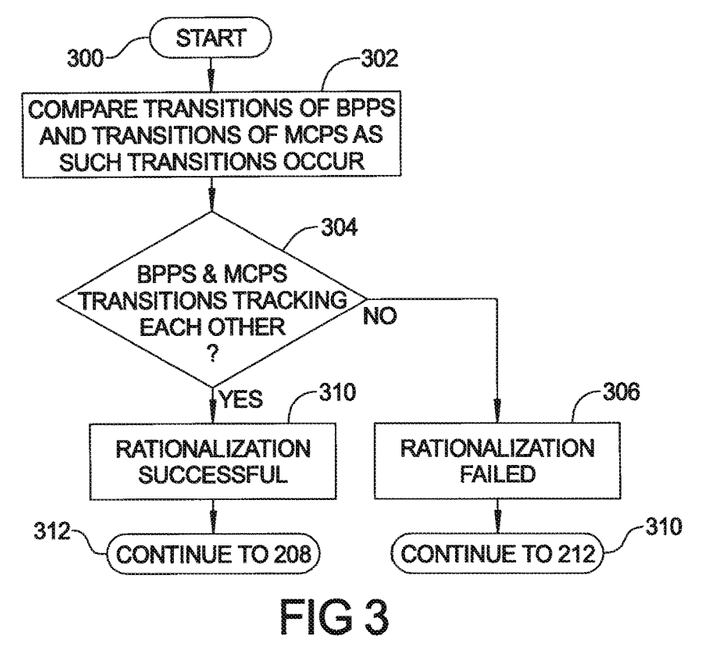
FIG. 3 is a flow chart showing logic for an example routine to rationalize the brake pedal position signal and the master cylinder pressure signal in accordance with an aspect of the present disclosure.

FIG. 3 is a flow chart showing logic for an example routine to rationalize the brake pedal position signal and the master cylinder pressure signal. The routine starts at 300. At 302, the routine compares transitions of the brake pedal position signal and transitions of the master cylinder pressure signal as such transitions occur. At 304, the routine checks whether the transitions of the brake pedal position signal and the transitions of the master cylinder pressure signal are tracking each other. The transitions are tracking each other when a comparable transition of one signal follows a transition of the other signal within a predetermined time period. That is, when a transition of the brake pedal position signal occurs first a comparable transition of the master cylinder pressure signal occurs within the predetermined time period and when a transition of the master cylinder pressure signal occurs first a comparable transition of the brake pedal position signal occurs within the predetermined time period. A comparable transition means that the lagging signal has transitioned in a manner consistent with the transition of the leading signal, as discussed in more detail below.

If at 304 the transitions of the brake pedal position signal and the master cylinder pressure signal are not tracking each other, the routine branches to 306 as the rationalization of the brake pedal position signal and the master cylinder pressure signal torque signal has failed and the routine then at 308 continues to block 214 in FIG. 2. If at 304 the transitions of the brake pedal position signal and the master cylinder pressure signal are tracking each other, the routine branches to 310 as the rationalization was successful and then at 312 continues to block 208 in FIG. 2.

Figure 4:
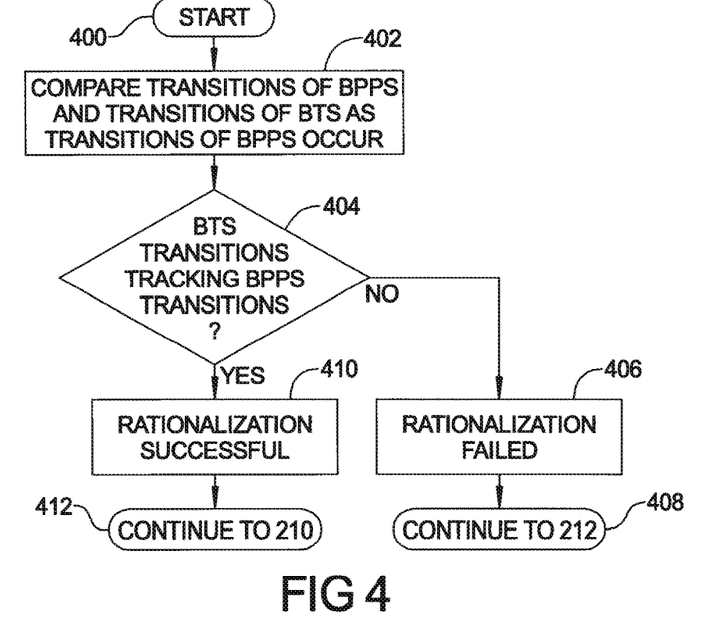
FIG. 4 is a flow chart showing logic for an example routine to rationalize the brake pedal position signal and the brake torque signal in accordance with an aspect of the present disclosure.

FIG. 4 is a flow chart showing logic for an example routine to rationalize the brake pedal position signal and the brake torque signal. The routine starts at 400. At 402, the routine compares transitions of the brake pedal position signal and the brake torque signal as transitions of the brake pedal position signal occur. At 404, the routine checks whether the transitions of the brake torque signal are tracking the transitions of the brake pedal position signal. The transitions of the brake torque signal are tracking the transitions of the brake pedal position signal when a comparable transition of the brake torque signal follows a transition of the brake pedal position signal within a predetermined time period. That is, when a transition of the brake pedal position signal occurs a comparable transition of the brake torque signal occurs within the predetermined time period. A comparable transition means that the brake torque signal has transitioned in a manner consistent with the transition of the brake pedal position signal, as discussed in more detail below.

If at 404 the transitions of the brake torque signal are not tracking the transitions of the brake pedal position signal, the routine branches to 406 as the rationalization of the brake pedal position signal and the brake torque signal has failed and the routine then at 408 continues to block 214 in FIG. 2. If at 404 the transitions of the brake torque signal are tracking the transitions of the brake pedal position signal, the routine branches to 410 as the rationalization was successful and then at 412 continues to block 208 in FIG. 2.

Figure 5:
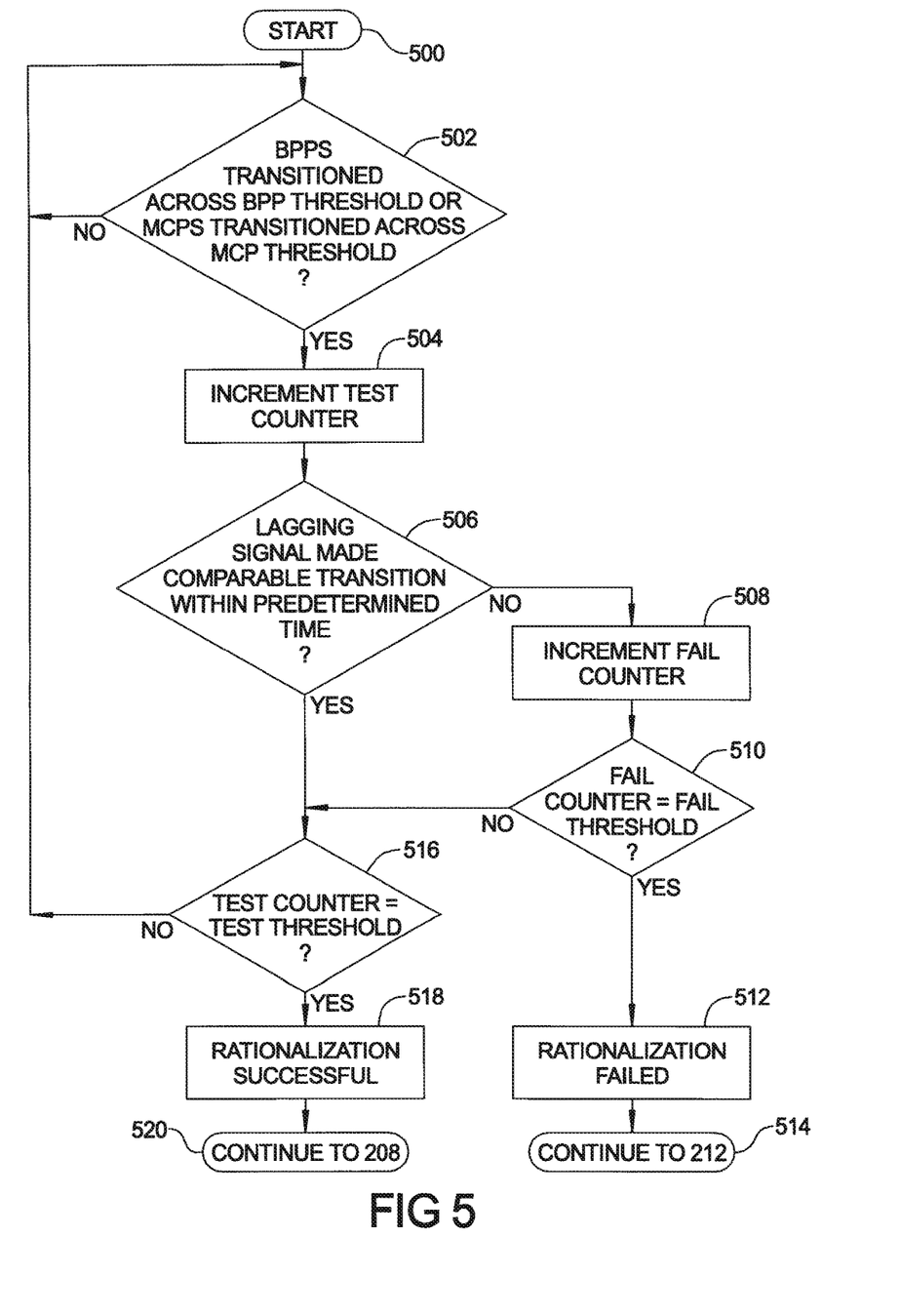
FIG. 5 is a flow chart showing logic for an example routine to rationalize the brake pedal position signal and the master cylinder pressure signal that can be used for the routine of FIG. 3.

FIG. 5 is a flow chart showing logic for an example routine to rationalize the brake pedal position signal and the master cylinder pressure signal that can be used for the routine of FIG. 3. The routine starts at 500 and at 502, the routine checks whether the brake pedal position signal has transitioned across a brake pedal position threshold or whether the master cylinder pressure signal has transitioned across a master cylinder pressure threshold. If not, the routine branches back to 502. If a transition occurred, the routine proceeds to 504 where it increments a test counter. The routine then proceeds to 506 where it checks whether the other of the brake pedal position signal and the master cylinder pressure signal made a comparable transition. For convenience of reference, the one of the brake pedal position signal and the master cylinder pressure signal that made the first transition is referred to herein as the leading signal and the other signal as the lagging signal. It should be understood that a lagging signal has made a comparable transition to the leading signal when the lagging signal transition across its threshold is indicative of the same condition as the transition of the leading signal about its threshold. For example, if a driver presses the brake pedal to apply the brake, the brake pedal position signal transitions across its threshold in a direction indicative of the brake pedal being pressed. For example, transitioning from a level indicative of the brake pedal being released to a level indicative of the brake pedal having been sufficiently pressed to apply the brakes. The master cylinder pressure signal should then make a comparable transition across the master cylinder pressure threshold such as increasing from a level indicative of a lower pressure of brake fluid in the master cylinder to a level indicative of a higher pressure of brake fluid in the master cylinder. It should be understood that these thresholds can be preset thresholds and that they can be calibratable thresholds that are set during a calibration procedure.

If at 506 the lagging signal did not make a comparable transition, the routine branches to 508 where it increments a fail counter and at 510 checks whether the fail counter has reached a fail threshold. If the fail counter has reached the fail threshold, the routine proceeds to 512 as the rationalization of the brake pedal position signal and the master cylinder pressure signal has failed and then at 514 continues to block 214 of FIG. 2.

If at 506 the lagging signal made a comparable transition to the transition of the leading signal, the routine proceeds to 516. If at 510 the fail counter has not reached the fail threshold, the routine also proceeds to 516. At 516, the routine checks whether the test counter has reached a test threshold. If not, the routine branches back to 502. If at 516 the test counter has reached the test threshold, the routine proceeds to 518 as the rationalization of the brake pedal position signal and the master cylinder pressure signal was successful and then at 520 continues to block 208 of FIG. 2. It should be understood that the test threshold and fail threshold can be preset number and that they can be calibratable numbers set during calibration. In this regard, the routine of FIG. 5 determines that the brake pedal position signal and the master cylinder pressure signal were successfully rationalized when after a predetermined number (the test threshold) of test events, which are transitions of a leading signal (either the brake pedal position signal or the master cylinder pressure signal as the case may be), the number of failures was below a predetermined number (the fail threshold).

Figure 6:
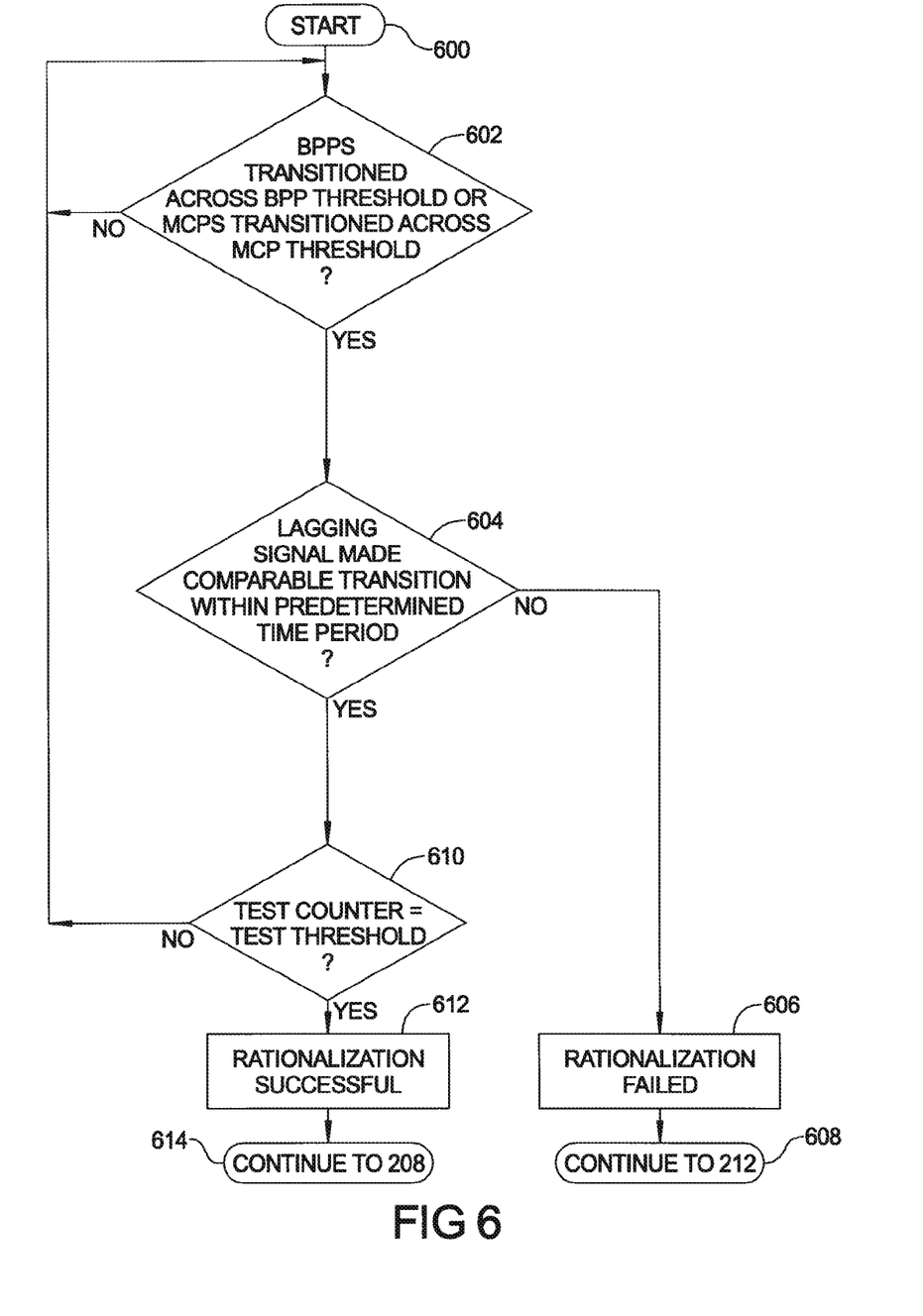
FIG. 6 is a flow chart showing logic for another example routine to rationalize the brake pedal position signal and the master cylinder pressure signal that can be used for the routine of FIG. 3.

FIG. 6 is a flow chart showing logic for another example routine to rationalize the brake pedal position signal and the master cylinder pressure signal that can be used for the routine of FIG. 3. The routine starts at 600 and at 602, the routine checks whether the brake pedal position signal has transitioned across a brake pedal position threshold or whether the master cylinder pressure signal has transitioned across a master cylinder pressure threshold. If not, the routine branches back to 602. If a transition occurred, the routine proceeds to 604 where it checks whether the lagging signal (the other of the brake pedal position signal and the master cylinder pressure signal as discussed above) made a comparable transition.

If at 604 the lagging signal did not make a comparable transition, the routine proceeds to 606 as the rationalization of the brake pedal position signal and the master cylinder pressure signal has failed and then at 608 continues to block 214 of FIG. 2. If at 604 the lagging signal made a comparable transition to the transition of the leading signal, the routine proceeds to 610. At 610, the routine checks whether the test counter has reached a test threshold. If not, the routine branches back to 602. If at 610 the test counter has reached the test threshold, the routine proceeds to 612 as the rationalization of the brake pedal position signal and the master cylinder pressure signal was successful and then at 614 continues to block 208 of FIG. 2. In this regard, the routine of FIG. 6 determines that the brake pedal position signal and the master cylinder pressure signal were successfully rationalized when there have been a predetermined number of successive transitions of the brake pedal position signal and the master cylinder pressure signal that track each other.

Figure 7:
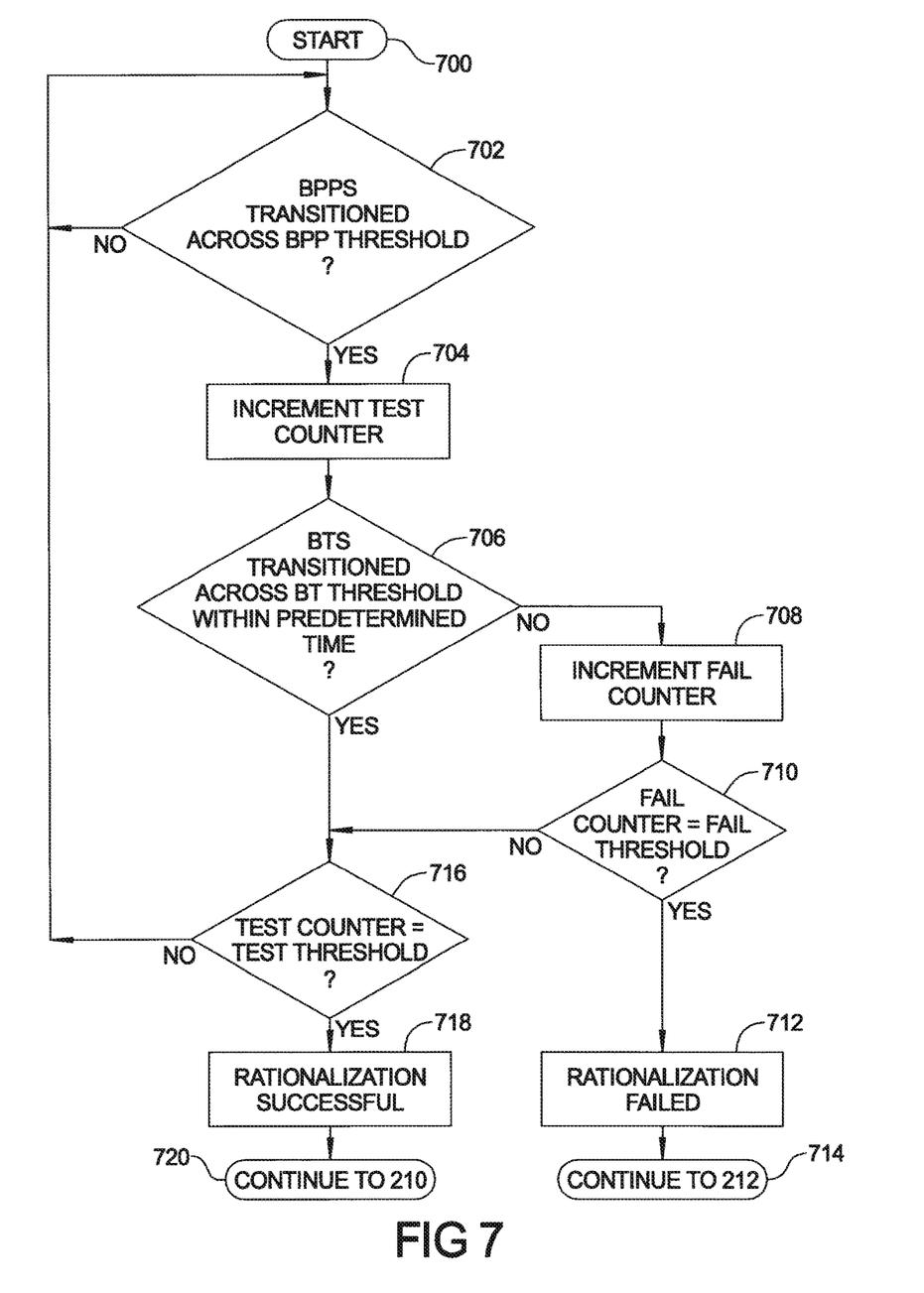
FIG. 7 is a flow chart showing logic for an example routine to rationalize the brake pedal position signal and the brake torque signal that can be used for the routine of FIG. 4.

FIG. 7 is a flow chart showing logic for an example routine to rationalize the brake pedal position signal and the brake torque signal that can be used for the routine of FIG. 4. The routine starts at 700 and at 702, the routine checks whether the brake pedal position signal has transitioned across a brake pedal position threshold. If not, the routine branches back to 702. If a transition occurred, the routine proceeds to 704 where it increments a test counter. The routine then proceeds to 706 where it checks whether the brake torque signal made a comparable transition. It should be understood that the brake torque signal has made a comparable transition to the brake pedal position signal when the brake torque signal transitions across its threshold is indicative of the same condition as the transition of the brake pedal position signal about its threshold indicates. For example, if a driver presses the brake pedal to apply the brake, the brake pedal position signal transitions across its threshold in a direction indicative of the brake pedal being pressed as discussed above. The brake torque signal should then make a comparable transition across the brake torque threshold such as increasing from a level indicative of a low or zero brake torque to a level indicative of a higher brake torque. It should be understood that these thresholds can be preset thresholds and that they can be calibratable thresholds that are set during a calibration procedure.

If at 706 the brake torque signal did not make a comparable transition, the routine branches to 708 where it increments a fail counter and at 710 checks whether the fail counter has reached a fail threshold. If the fail counter has reached the fail threshold, the routine proceeds to 712 as the rationalization of the brake pedal position signal and the brake torque signal has failed and then at 714 continues to block 214 of FIG. 2.

If at 706 the brake torque signal made a comparable transition to the transition of the brake pedal position signal, the routine proceeds to 716. If at 710 the fail counter has not reached the fail threshold, the routine also proceeds to 716. At 716, the routine checks whether the test counter has reached a test threshold. If not, the routine branches back to 702. If at 716 the test counter has reached the test threshold, the routine proceeds to 718 as the rationalization of the brake pedal position signal and the brake torque signal was successful and then at 720 continues to block 212 of FIG. 2. It should be understood that the test threshold and fail threshold can be preset number and that they can be calibratable numbers set during calibration. In this regard, the routine of FIG. 7 determines that the brake pedal position signal and the brake torque signal were successfully rationalized when after a predetermined number (the test threshold) of test events, which are transitions of a brake pedal position signal, the number of failures was below a predetermined number (the fail threshold).

Figure 8:
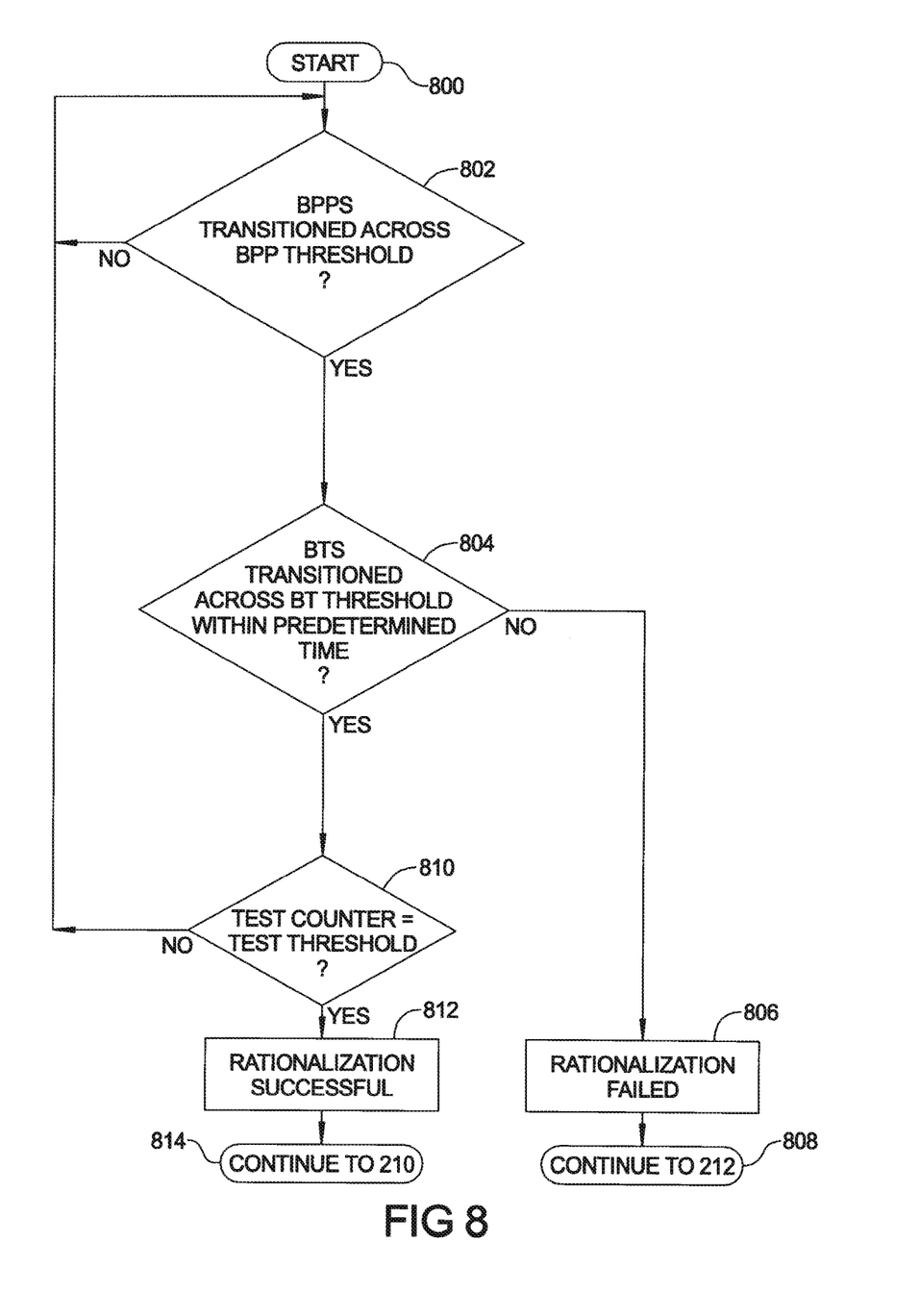
FIG. 8 is a flow chart showing logic for another example routine to rationalize the brake pedal position signal and the master cylinder pressure signal that can be used for the routine of FIG. 4.

FIG. 8 is a flow chart showing logic for another example routine to rationalize the brake pedal position signal and the brake torque signal that can be used for the routine of FIG. 4. The routine starts at 800 and at 802, the routine checks whether the brake pedal position signal has transitioned across a brake pedal position threshold. If not, the routine branches back to 802. If a transition occurred, the routine proceeds to 804 where it checks whether the brake torque signal made a comparable transition.

If at 804 the brake torque signal did not make a comparable transition, the routine proceeds to 806 as the rationalization of the brake pedal position signal and the brake torque signal has failed and then at 808 continues to block 214 of FIG. 2. If at 804 the brake torque signal made a comparable transition to the transition of the brake pedal position signal, the routine proceeds to 810. At 810, the routine checks whether the test counter has reached a test threshold. If not, the routine branches back to 802. If at 810 the test counter has reached the test threshold, the routine proceeds to 812 as the rationalization of the brake pedal position signal and the brake torque signal was successful and then at 814 continues to block 212 of FIG. 2. In this regard, the routine of FIG. 8 determines that the brake pedal position signal and the brake torque signal were successfully rationalized when there were a predetermined number (test threshold) of successive transitions of the brake pedal position signal and the brake torque signal where each transition of each brake torque signal tracked each transition of a the brake pedal position signal. It should be understood that the test threshold can be a preset number and can be a calibratable number set during calibration.

The electronic control unit such as EMS ECU 106 in which the above described routines are implemented is or includes any of a digital processor (DSP), microprocessor, microcontroller, or other programmable device which are programmed with software implementing the above described methods. It should be understood that alternatively it is or includes other logic devices, such as a Field Programmable Gate Array (FPGA), a complex programmable logic device (CPLD), or application specific integrated circuit (ASIC). When it is stated that the electronic control unit performs a function or is configured to perform a function, it should be understood that the electronic control unit is configured to do so with appropriate logic (such as in software, logic devices, or a combination thereof).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of validating with an electronic control unit of a vehicle a brake torque signal for use as a brake event input signal for at least diagnostic routines in the vehicle's onboard diagnostics that use the brake event input signal as an input and enabling or disabling use of the brake torque signal as the brake event input signal based on whether the validation is successful, the method comprising:
   rationalizing with the electronic control unit a brake pedal position signal and a master cylinder pressure signal;
   upon successfully rationalizing the brake pedal position signal with the master cylinder pressure signal, rationalizing with the electronic control unit the brake pedal position signal with the brake torque signal;
   determining with the electronic control unit that the brake torque signal has been successfully validated when the brake pedal position signal was successfully rationalized with the brake torque signal after the brake pedal position signal was successfully rationalized with the master cylinder pressure cylinder, and upon determining that the brake torque signal has been successfully validated, having the electronic control unit enable use of the brake torque signal as the brake event input signal for at least the diagnostic routines of the vehicles onboard diagnostic routines that use the brake torque signal as the brake event input signal;
   determining with the electronic control unit that the brake torque signal failed validation when the brake pedal position signal and master cylinder pressure signal failed rationalization or the brake pedal position signal and the brake torque signal failed rationalization, and upon determining that the brake torque signal failed validation, having the electronic control unit disable, during a current drive cycle, use of the brake torque signal as the brake event input signal for at least the diagnostic routines of the vehicle's onboard diagnostics that use the brake torque signal as the brake event input signal.

2. The method of claim 1 wherein:
   rationalizing the brake pedal position signal and the master cylinder pressure signal includes:
      comparing with the electronic control unit transitions of the brake pedal position signal with transitions of the master cylinder pressure signal; and
      determining that the brake pedal position signal is successfully rationalized with the master cylinder pressure signal when the transitions of the brake pedal position signal and transitions of the master cylinder pressure signal track each other; and
   rationalizing the brake pedal position signal with the brake torque signal includes;
      comparing with the electronic control unit transitions of the brake pedal position signal with transitions of the brake torque signal; and
      determining that the brake pedal position signal is successfully rationalized with the brake torque signal based when the transitions of the brake torque signal track the transitions of the brake pedal position signal.

3. The method of claim 2 wherein:
   rationalizing the brake pedal position signal with the master cylinder pressure signal further includes determining with the electronic control unit that the brake pedal position signal and the master cylinder pressure signal were successfully rationalized upon a predetermined number of first test events having occurred without a predetermined number of fail transitions of the brake pedal position signal and the master cylinder pressure signal not tracking each other having occurred, wherein the first test event is each first to occur transition of the brake pedal position signal or the master cylinder pressure signal; and rationalizing the brake pedal position signal and the brake torque signal further includes determining with the electronic control unit that the brake pedal position signal and the brake torque signal were successfully rationalized upon a predetermined number second test events having occurred without a predetermined number of fail transitions of the brake torque signal not tracking the transitions of the brake pedal position signal having occurred, wherein the second test event is each transition of the brake pedal position signal.

4. The method of claim 2 wherein:

rationalizing the brake pedal position signal with the master cylinder pressure signal further includes determining with the electronic control unit that the brake pedal position signal and the master cylinder pressure signal were successfully rationalized when there were a predetermined number of successive transitions of the brake pedal position signal and the master cylinder pressure signal that track each other, and rationalizing the brake pedal position signal with the brake torque signal further includes determining with the electronic control unit that the brake pedal position signal and the brake torque signal were successfully rationalized when there were a predetermined number of successive transitions of the brake pedal position signal and the brake torque signal where the transition of the brake torque signal tracked the transition of the brake pedal position signal.

5. The method of claim 2 wherein:

determining that the transitions of the brake pedal position signal and the master cylinder pressure signal are tracking each other includes determining that they track each other when, after each first to occur transition of the brake pedal position signal about a brake pedal position threshold or the master cylinder pressure signal about a master cylinder pressure threshold:
  the other of the brake pedal position signal has a comparable transition about the brake pedal position threshold within a first predetermined time; or
  the master cylinder pressure signal has a comparable transition about the master cylinder pressure threshold within the first predetermined time; and determining that the transitions of the brake pedal position signal and the brake torque signal are tracking each other includes determining that they track each other when, after each transition of the brake pedal position signal about the brake pedal position threshold, the brake torque signal has a comparable transition about a brake torque threshold within a second predetermined time.

6. The method of claim 1 further including:

upon determining that the brake torque signal was successfully validated, having the electronic control unit enable use of the brake torque signal as the brake event input signal for control routines of the vehicle that use the brake torque signal as the brake event input signal; and upon determining that the brake torque signal failed validation, having the electronic control unit disable, during a current drive cycle, use of the brake torque signal as the brake event input signal for control routines of the vehicle that use the brake torque signal as the brake event input signal.

* * * * *